(12) United States Patent
Matsushima et al.

(10) Patent No.: US 8,979,132 B2
(45) Date of Patent: Mar. 17, 2015

(54) MUDGUARD STRUCTURE FOR STRADDLE-RIDE TYPE VEHICLE

(75) Inventors: Satoshi Matsushima, Wako (JP); Yusuke Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 13/564,774

(22) Filed: Aug. 2, 2012

(65) Prior Publication Data
US 2013/0049343 A1 Feb. 28, 2013

(30) Foreign Application Priority Data

Aug. 25, 2011 (JP) ................. 2011-183428

(51) Int. Cl.
  B62J 15/04 (2006.01)
  B62J 33/00 (2006.01)
  B62K 11/04 (2006.01)
(52) U.S. Cl.
  CPC ...... *B62J 15/04* (2013.01); *B62J 33/00* (2013.01); *B62K 11/04* (2013.01)
  USPC ..................................... 280/852; 180/68.3
(58) Field of Classification Search
  None
  See application file for complete search history.

(56) References Cited

U.S. PATENT DOCUMENTS

2008/0308331 A1* 12/2008 Trunkenpolz et al. ....... 180/68.3

FOREIGN PATENT DOCUMENTS

| EP | 1995163 A1 | 11/2008 |
| JP | 59-89279 A | 5/1984 |
| JP | 59-170092 U | 11/1984 |
| JP | 06-135362 A | 5/1994 |
| JP | 2001-088762 A | 4/2001 |

* cited by examiner

*Primary Examiner* — J. Allen Shriver, II
*Assistant Examiner* — Hilary L Johns
(74) *Attorney, Agent, or Firm* — Birch, Stewart, Kolasch & Birch, LLP

(57) ABSTRACT

A mudguard structure for a straddle-ride vehicle suppresses the enlargement of an attachment portion of a mud shield plate and makes satisfactory the external appearance of the circumference of a rear fender. A mudguard has left and right erecting walls erecting to the rear from respective left and right outer edges thereof and a front-lower concave portion integrally continuing into a lower portion of a rear wheel runout concave portion of a rear fender. A box-like attachment portion for attachment to the rear fender is located at each of both, left and right, sides of the upper end portion of the mudguard.

20 Claims, 6 Drawing Sheets

MUDGUARD STRUCTURE FOR STRADDLE-RIDE TYPE VEHICLE

CROSS-REFERENCE TO RELATED APPLICATIONS

The present application claims priority under 35 USC 119 to Japanese Patent Application No. 2011-183428 filed Aug. 25, 2011 the entire contents of which are hereby incorporated by reference.

BACKGROUND OF THE INVENTION

1. Field of the Invention

The present invention relates to a mudguard structure for a straddle-ride vehicle.

2. Description of Background Art

A mudguard structure for a motorcycle has heretofore been configured to attach a separate mud shield plate to a front lower end portion of a rear fender covering a rear wheel from above so as to extend the front lower end portion downward in some cases. See, for example, Japanese Patent Laid-open No. Hei. 6-135362.

For the convenience of the layout of an exhaust pipe extending from an engine, if the exhaust pipe is disposed in front of the mud shield plate, the mud shield plate is shifted toward the rear of a vehicle body to increase its vertical length.

To attach the mud shield plate increased in size and in weight, measures are needed to enlarge a portion to be attached to the rear fender to suppress flapping or the like for maintaining the attachment rigidity. This poses a problem in that also an attachment portion on the rear fender side is increased in size to cause a restriction resulting from the ensuring of attachment space.

In particular, an off-road vehicle ensuring a vertical stroke amount of a rear wheel is such that a rear portion of a rear fender extends to the rear in parallel to the ground. A mud shield plate is externally seen from the rear of the vehicle. If growing in size, the mud shield plate has an excessive sense of existence, which leads to a problem of impairing the external appearance of the circumference of the rear fender.

SUMMARY AND OBJECTS OF THE INVENTION

Accordingly, it is an object of the present invention to provide a mudguard structure for a straddle-ride type vehicle that can suppress the enlargement of an attachment portion of a mud shield plate and make the external appearance of the circumference of a rear fender satisfactory.

According to an embodiment of the present invention, a mudguard structure for a straddle-ride type vehicle (1) including a rear swing arm (16) having a front end portion (16a) vertically swingably supported by a body frame (5) with a rear wheel (17) supported by a rear end portion of the rear swing arm (16). A rear fender (46) covers the rear wheel (17) from above. A rear shock absorber (18) is disposed at a front end side of the rear swing arm (16) and interposed between the rear swing arm (16) and the body frame (5). A mud shield plate (51) is disposed between the rear shock absorber (18) and the rear wheel (17) in rear of the rear shock absorber (18) and attached to the rear fender (46).

The mudguard structure for the straddle-ride type vehicle includes a mud shield plate (51) with left and right erecting walls (53) erecting to the rear from respective left and right outer edges of at least an upper portion thereof. A plate side concave portion (61) is formed on the left-right inside of at least the upper portion and integrally continuing into a lower portion of a rear wheel runout concave portion (47) formed on the left-right inside of the rear fender (46).

A pair of left and right attachment portions (55) to the rear fender (46) is located on both, left and right, sides of an upper end portion of the mud shield plate (51).

The left and right attachment portions (55) each include a fastening wall (56) brought into contact with a fender side attachment portion (48) of the rear fender (46) from the rear. An inside wall (57) is erected from the rear from a left-right inside edge of the fastening wall (56). An outside wall (58) is erected from the rear from a left-right outside edge of the fastening wall (56) and integrally continuing into the erecting wall (53). An upper wall (59) is erected from the rear from an upper edge of the fastening wall (56) and integrally continuing into the inside and outside walls (57, 58).

In addition, a rider mounts the straddle-ride type vehicle by straddling a vehicle body and includes a swing arm type suspension on a rear wheel side. In addition, the straddle-ride type vehicle includes three-wheeled straddle-ride type vehicles (including vehicles having one front wheel and two rear wheels and vehicles having two front wheels and one rear wheel) and four-wheeled straddle-ride type vehicle as well as motorcycles.

According to an embodiment of the present invention, the rear edges of the left and right erecting walls (53) and the left and right lateral edges of the plate side concave portion (61) form character lines (L1, L2) integrally continuing into ridge lines of the rear fender (46) seen from the outside.

According to an embodiment of the present invention, the rear fender (46) has a case-forming portion (44c) forming at least a portion of an air cleaner case (42) mounted on the body frame (5). The mud shield plate (51) is attached to the case-forming portion (44c).

According to an embodiment of the present invention, the vehicle (1) includes an exhaust pipe (28) extending toward the rear of the vehicle body from an engine (21) mounted on the body frame (5), and the exhaust pipe (28) passes through between the rear shock absorber (18) and the mudguard (51).

According to an embodiment of the present invention, the exhaust pipe (28) has a single upstream side exhaust pipe (28a) connected to the engine (21) and a pair of downstream side exhaust pipes (28b, 28c) connected to a pair of respective left and right mufflers (29), the pair of downstream side exhaust pipes (28b, 28c) bifurcates between the rear shock absorber (18) and the mudguard (51) as viewed from the side, and one (28b) of the pair of downstream side exhaust pipes (28b, 28c) passes through between the rear shock absorber (18) and the mud shield plate (51).

According to an embodiment of the present invention, the plate side concave portion and the erecting walls are formed on the upper portion of the mud shield plate located on the side supported by the rear fender. In addition, the left and right attachment portions each shaped like a box, having the inside and outside walls and the upper wall and continuing into the erecting wall are formed on the upper portion mentioned above. Therefore, while ensuring the rigidity of the upper portion of the mud shield plate and of the attachment surface, the enlargement of the left and right attachment portions can be suppressed. Thus, the enlargement of the attachment surface on the rear fender side is suppressed and the degree of freedom of design can be improved. The plate side concave portion integrally continuing into the rear wheel runout concave portion of the rear fender is formed on the upper portion of the mud shield plate. Therefore, the external appearance integral with the rear fender can be formed to improve visual quality.

According to an embodiment of the present invention, the rear fender and the mud shield plate are made to have external appearance with a sense of unity, which improves visual quality.

According to an embodiment of the present invention, although the mud shield plate is configured to be attached to the case-forming portion of the rear fender, an influence on the capacity of the air cleaner can be avoided.

According to an embodiment of the present invention, although the mud shield plate is configured to be shifted to the rear to avoid the exhaust pipe, the upper end portion of the vertically elongated mud shield plate can be attached with high rigidity.

According to an embodiment of the present invention, the exhaust pipe having the single upstream side exhaust pipe bifurcating into the pair of downstream side exhaust pipes can efficiently be arranged around the mud shield plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
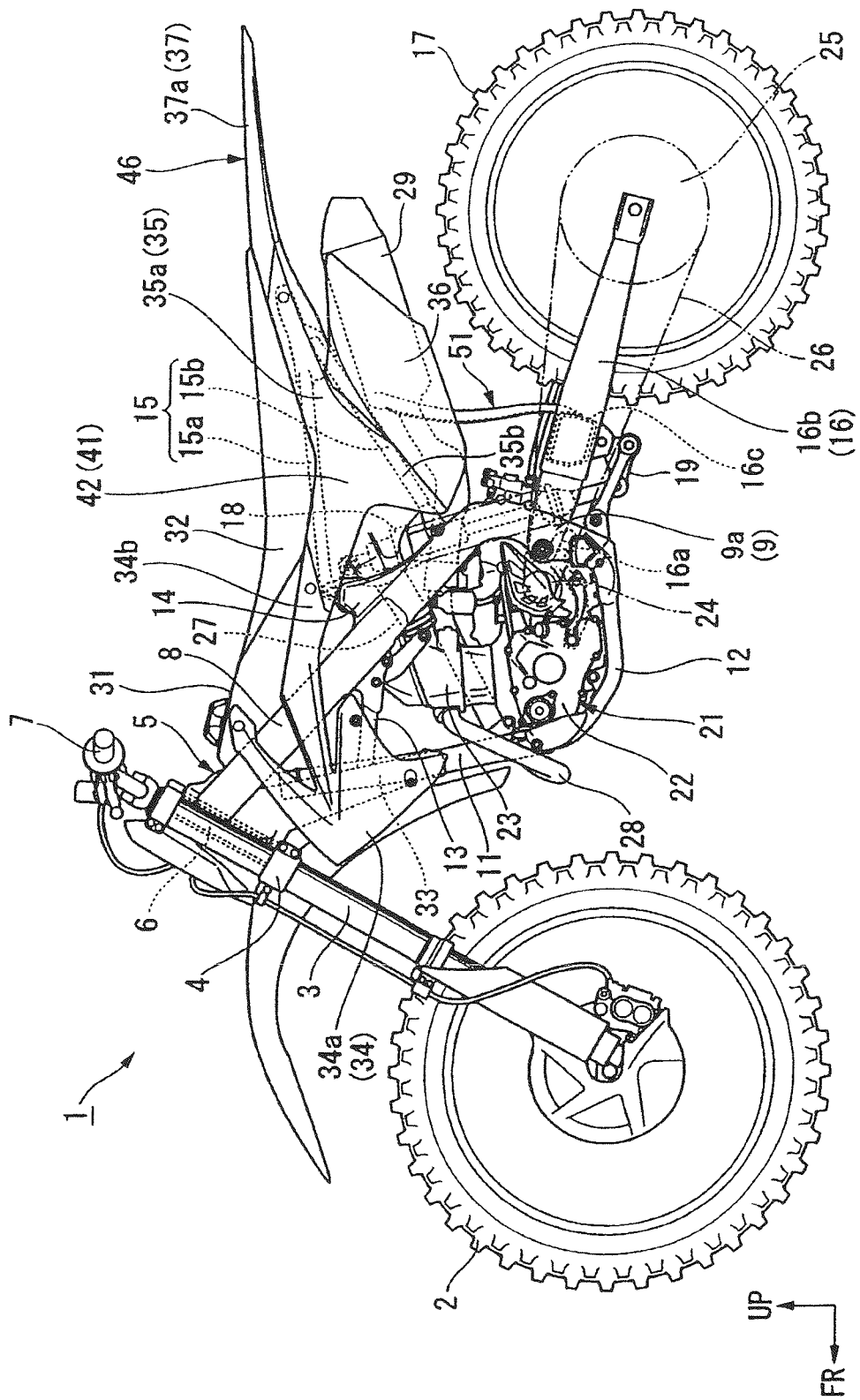
FIG. 1 is a left lateral view of a motorcycle according to an embodiment of the present invention.

Embodiments of the present invention will hereinafter be described with reference to the drawings. In addition, the directions such as front, back or rear, left and right in the following description are the same as those of a vehicle described below unless otherwise described. Arrow FR indicating the front of the vehicle, arrow LH indicating the left of the vehicle and arrow UP indicating the upside of the vehicle are shown in place in the drawings used for the following explanation.

An off-road type motorcycle (a straddle-ride type vehicle) 1 is shown in FIG. 1. The motorcycle 1 has a front wheel 2 rotatably supported by lower end portions of left and right front forks 3. The left and right forks 3 are pivotally supported at upper portions by a head pipe 6 located at a front end of a body frame 5 via a steering stem 4 in a steerable manner. A steering handlebar 7 is mounted on the upper portion of the steering stem 4.

The body frame 5 is composed of several types of steel integrally joined by welding or the like. A pair of left and right main tubes 8 extends to the rear and downward from an upper rear side of the head pipe 6 toward the rear. The left and right main tubes 8 have rear end portions continue into the corresponding upper end portions of left and right pivot frames 9 at an anteroposteriorly intermediate portion of the vehicle body. The left and right pivot frames 9 extend rearwardly and downwardly at the same inclination as the left and right main tubes 8 from the corresponding rear end portions of the main tubes 8 toward the rear. Then, the pivot frames 9 bend downward and extend. The downward extending portions 9a of the left and right pivot frames 9 are illustrated in FIG. 1.

A single down frame 11 extends downward from the lower rear side of the head pipe 6. Left and right lower frames 12 bifurcate right and left from the lower end of the down frame 11. The left and right lower frames 12 bend to the rear and extend at the lower end portion of the body frame 5 and are connected to corresponding lower end portion front sides of the left and right pivot frames 9 (the downward extending portions 9a). A pair of left and right gusset frames 13 is each spanned between the vertical intermediate portion rear side of the down frame 11 and each of the anteroposteriorly intermediate portion lower sides of the left and right down tubes 8.

A seat frame 15 is joined to a rear portion of the body frame 5. The seat frame 15 has a pair of left and right seat rails 15a and a pair of left and right support frames 15b. The seat rails 15a extend to the rear from the corresponding rear end portions of the left and right main frames. The support frames 15b extend obliquely upward and to the rear from the left and right pivot frames 9 toward the rear end portions of the left and right seat rails 15a. An occupant-sitting seat 32 is supported on the left and right seat rails 15a.

A rear swing arm 16 has a front end portion 16a that is pivotally supported by the front sides of the downward extending portions 9a of the left and right pivot frames 9 in a vertically swingable manner.

Figure 2:
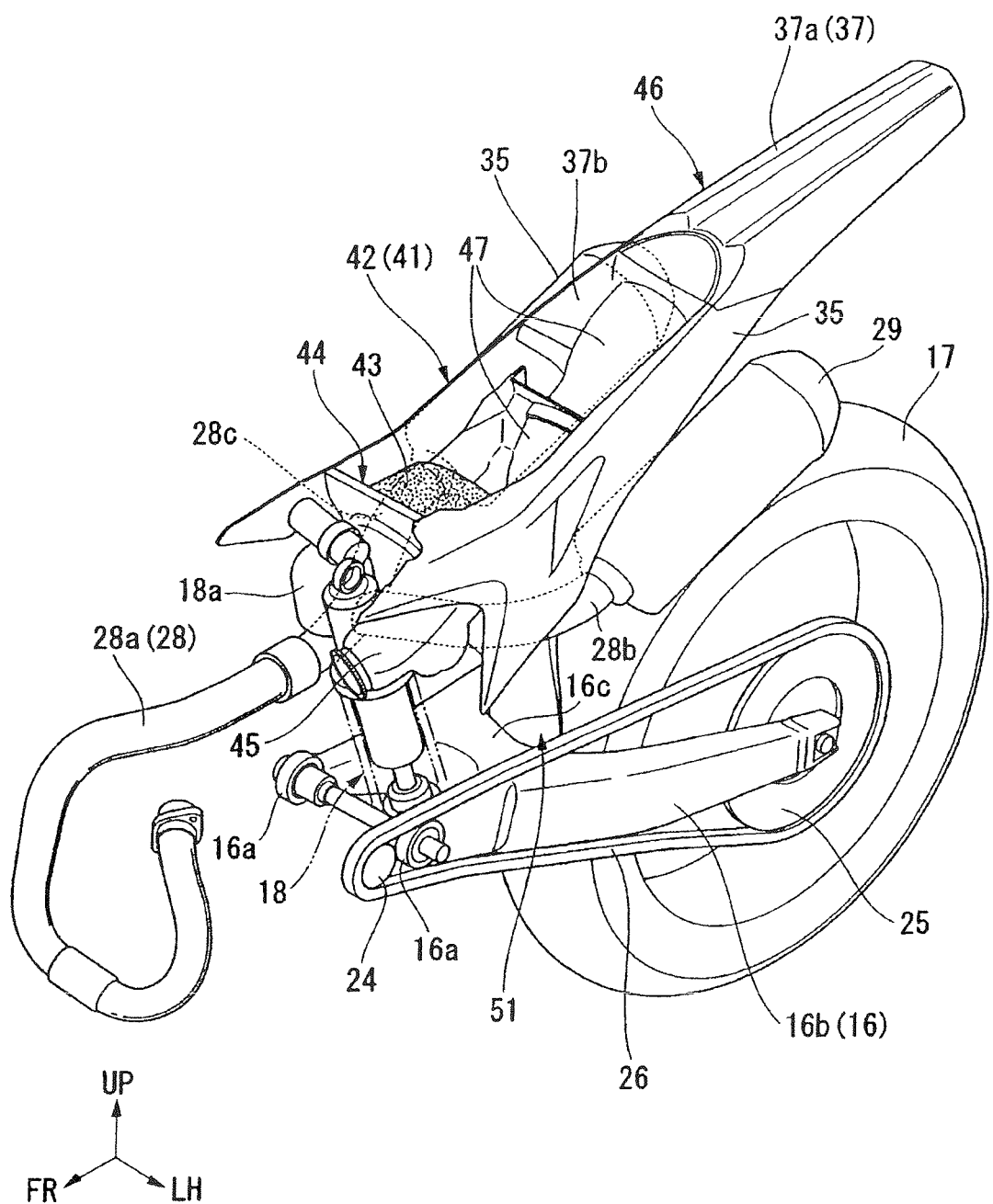
FIG. 2 is a perspective view of a vehicle-body rear portion of the motorcycle as viewed from the left front.

As illustrated in FIG. 2, the rear swing arm 16 is composed of several types of aluminum alloy members integrally joined by welding or the like. The rear swing arm 16 has a pair of left and right front end portions 16a, a pair of left and right arm portions 16b. and a cross member 16c. The front end portions 16a are each shaped like a pipe extending in a vehicle-width direction. The arm portions 16b extend to the rear from the corresponding left and right front end portions 16a. The cross member 16c interconnects the left and right arm portions 16b at a position to the rear of the left and right front end portions 16a. A rear wheel 17 of the motorcycle 1 is rotatably supported by the rear end portions of the rear swing arms 16 (the left and right arm portions 16b). A rear shock absorber 18 has a lower end portion that is connected to the lower side of the cross member 16c via a link mechanism 19. The rear shock absorber 18 extends vertically on the proximal end side of the rear swing arm 16. The rear shock absorber 18 has an upper end portion that is connected to the cross member 14 spanned between the rear end portions of the left and right main tubes 8.

An engine 21 that is a prime mover of the motorcycle 1 is mounted inside the body frame 5. The engine 21 is a water-cooled single-cylinder engine. A cylinder 23 is installed on a crankcase 22 constituting a lower part of the engine so as to be generally erected therefrom. A drive sprocket 24 is disposed on the left side of the rear portion of the crankcase 22. A drive chain 26 is wound around this drive sprocket 24 and around a driven sprocket 25 located on the left side of the rear wheel 17. A throttle body 27 is connected to the rear portion of the cylinder 23. An air cleaner 41 is connected to the rear portion of the throttle body 27. An exhaust pipe 28 is connected to the front portion of the cylinder 23.

The exhaust pipe 28 extends to the right side of the vehicle body, then bifurcated, and connected to a pair of left and right mufflers 29 disposed on both sides of the rear portion of the vehicle body. More specifically, the exhaust pipe 28 has a single upstream side exhaust pipe 28a connected to the engine 21 and a pair of downstream side exhaust pipes 28b, 28c connected to the respective left and right mufflers 29.

The upstream side exhaust pipe 28a extends forward and obliquely leftward from the front of the cylinder 23 and then bends obliquely forward and downward. In addition, the upstream side exhaust pipe 28a bends to return obliquely to the rear and upward, at a position forward of the lower portion of the down frame 11, from the left side to right side of the vehicle body. Thereafter, the upstream side exhaust pipe 28a bends to the rear at a position overlapping the front of the cylinder 23 as viewed from the side and extends to the rear on the right of the vehicle body. Then, the upstream side exhaust pipe 28a bifurcates into the pair of downstream side exhaust pipes 28b, 28c at a position to the rear of the rear shock absorber 18 and forward of a mudguard 51 described later as viewed from the side.

One of the downstream side exhaust pipes 28b, 28c extends to the left from the bifurcating position, passing through between the rear shock absorber 18 and the mudguard 51, and reaches the left side of the vehicle body. Thereafter, it bends and extends to the rear and is connected to the front end of the left muffler 29. The other of the downstream side exhaust pipes 28b, 28c extends to the rear on the right side of the vehicle body from the bifurcating position without any change and is connected to the right muffler 29. One of the downstream side exhaust pipes 28b, 28c that is connected to the left muffler 29 is hereinafter called the left downstream side exhaust pipe 28b. In addition, the other of the downstream side exhaust pipes 28b, 28c that is connected to the right muffler 29 is called the right downstream side exhaust pipe 28c.

Referring to FIG. 1, a pair of left and right shrouds 34 (a body cover) is mounted on the side of the front portion of the body frame 5 so as to cover the external side of a radiator 33 and other components disposed on the side of the down frame 11. The shroud 34 is a resin molded article and has a front portion (a main body portion) 34a covering a covered object and an arm portion 34b extending to the rear.

A pair of left and right side covers 35 is attached on the side of the seat frame 15 and is disposed along the lower edge of the side portion of the seat 32 so as to cover the side of the vehicle body. The side cover 35 is a resin molded article and has an upper portion (a main body portion) 35a extending along the lower edge of the side portion of the seat 32. In addition, the side cover 35 has an arm portion 35b extending obliquely forward and downward from its anteroposteriorly intermediate portion. The upper portion 35a has a front end portion integrally continuing into a rear end portion of the arm portion 34b of the shroud 34. The arm portion 35b is inclined along the support frame 15b as viewed from the side.

A pair of left and right muffler covers 36 is attached below the rear portion of the side cover 35 so as to cover the external sides of the downstream side exhaust pipes 28b, 28c and the left and right muffler 29. The downstream side exhaust pipes 28b, 28c and the left and right mufflers 29 are disposed below the side covers 35 and the support frames 15b as viewed from the side. The muffler cover 36 is a resin molded article and is disposed to be inclined to the rear and upward as viewed from the side similarly to the left and right mufflers 29.

Figure 3:
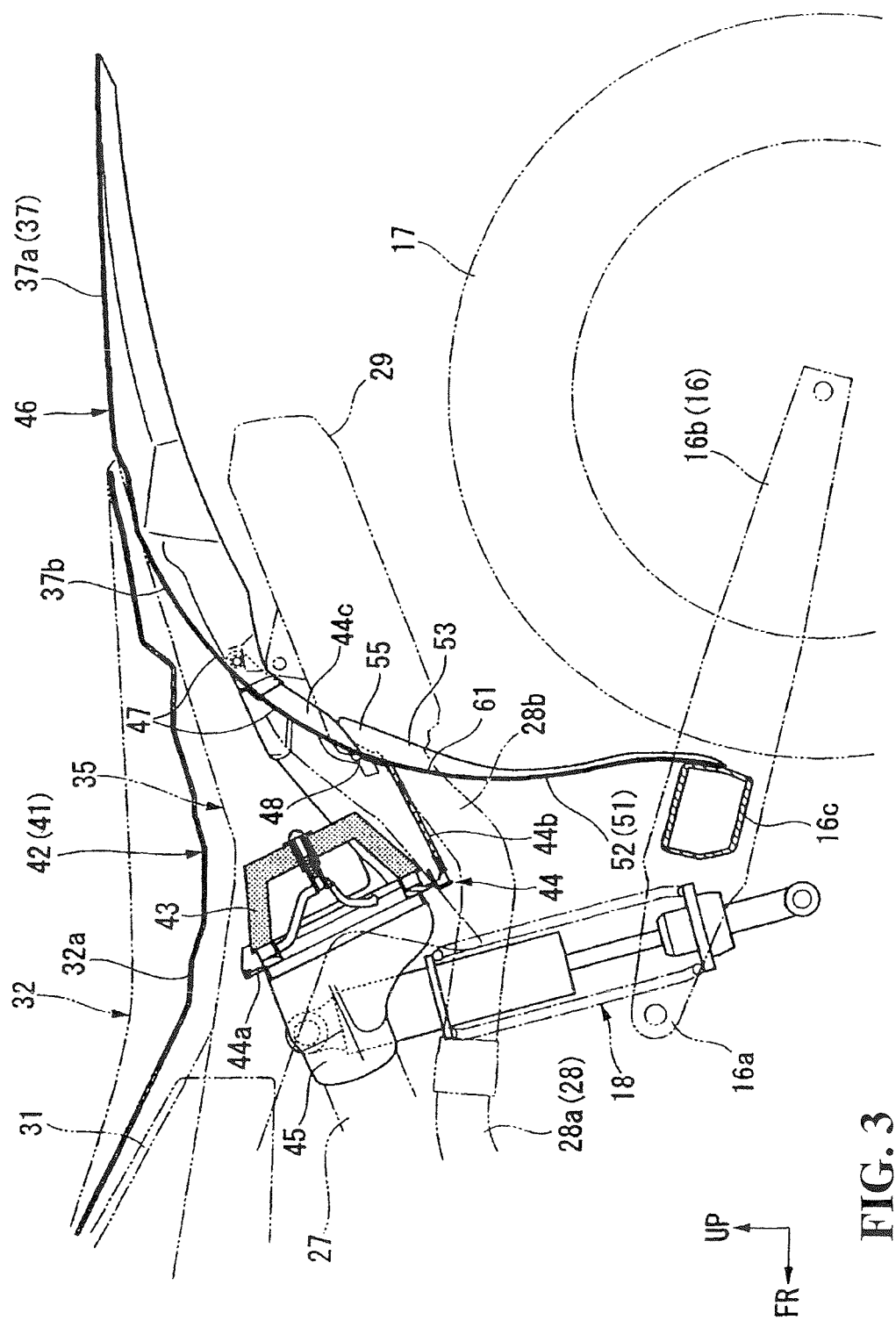
FIG. 3 is a cross-sectional view of the vehicle-body rear portion of the motorcycle taken along the left-right central plane of the vehicle body.

With additional reference to FIG. 3, a tail rear fender 37 is installed to the rear of the rear end portion of the seat 32. More specifically, the tail rear fender 37 is disposed as if the seat 32 extends to the rear along a generally horizontal upper surface (a seat surface) thereof. The tail rear fender 37 is a resin molded article. The tail rear fender 37 integrally has a generally horizontal plate-like main body portion 37a and an inner portion 37b. The main body portion 37a is located to the rear of the seat 32 and is formed as part of the external surface of the vehicle body. The inner portion 37b extends below the rear portion of the seat 32 in such a manner that only its lower surface facing the rear wheel 17 can be seen from the outside.

The seat 32 is configured such that a shock absorber material such as urethane sponge or the like is installed on a seat bottom plate 32a which is a resin molded article and a seat-surface skin is covered on the shock absorber material (only the seat bottom plate 32a is shown in the figure).

A fuel tank 31 is disposed between the left and right main tubes 8. The fuel tank 31 has an upper portion above the upper edges of the left and right main tubes 8. A front portion of the seat 32 is supported on the rear portion of the fuel tank 31.

An air cleaner 41 connected to a rear portion of the throttle body 27 is such that an element 43 is housed in an air cleaner case 42.

The air cleaner case 42 is composed of a front-lower case body 44 forming a front wall portion and a front lower wall portion; the left and right side covers 35 forming left and right lateral wall portions; the tail rear fender 37 (the inner portion 37b) forming a rear lower wall portion; and the seat bottom plate 32a forming an upper wall portion.

The element 43 shaped like a container opening forward is held at a position to the rear of a case front wall portion 44a formed as part of the front-lower case body 44. The element 43 is made of e.g. urethane sponge. Air is introduced into the air cleaner case 42 and passed through the element 43 from the outer circumferential side to inner circumferential side thereof for filtration.

A connecting tube 45 extending toward the throttle body 27 is mounted forward of the case front-wall portion 44a. The connecting tube 45 is made of an elastic body such as synthetic rubber. The inside space (a clean side) of the element 43 communicates with the throttle body 27 via the connecting tube 45. The connecting tube 45 extends forward so as to bypass the left side of the upper end portion of the rear shock absorber 18. A sub tank 18a for a damper is disposed on the right side of the upper end portion of the rear shock absorber 18 (see FIG. 2).

A rear fender 46 covering the upper portion of the rear wheel 17 from above is disposed at a position upward away from the rear wheel 17.

The rear fender 46 is composed of a rear inclined portion 44c and the tail rear fender 37 continuous with the upper rear portion of the rear inclined portion 44c. The rear inclined portion 44c is a rear portion of the case front-lower wall portion 44b formed as part of the front lower case body 44 and is inclined to the rear and upward. A front portion (the inner portion 37b) of the tail rear fender 37, the rear inclined portion 44c and the mudguard 51 disposed below the rear inclined portion 44c are integrally continuous with each other so as to draw an arc-like shape equal to the outer shape of the front upside of the rear wheel 17 as viewed from the side.

As illustrated in FIGS. 2 through 5, a rear wheel runout concave portion 47 is formed on the left-right inside of the inner portion 37b of the rear fender 46 so as to extend over the inner portion 37b and the rear inclined portion 44c. The rear wheel runout concave portion 47 is formed in a curbed shape equal to the outer circumferential portion (a tread surface) of the rear wheel 17 and is concaved forward and upward. In addition, symbol CL in FIG. 5 indicates a left-right centerline of the vehicle body.

A pair of left and right fender side attachment portions 48 is located on the left and right outsides (left and right external sides of the rear wheel runout concave portion 47 at the rear inclined portion 44c) of the front portion of the rear fender 46. The left and right fender side attachment portions 48 are used to fixedly fasten the upper end portion of the mudguard 51.

The mudguard 51 (the mud shield plate) is formed like a plate having anteroposterior thickness and is disposed between the rear shock absorber 18 and the rear wheel 17 to the rear away from the rear shock absorber 18. The mudguard 51 extends downward from the fender side attachment portion 48 of the rear fender 46 (the air cleaner case 42) to the rear of the cross member 16c of the rear swing arm 16 downward away from the fender side attachment portion 48.

The mudguard 51 is a resin molded article. The mudguard 51 has a vertically extending bending-plate portion 52 shaped in a forward convex arc in section generally perpendicular to the above-mentioned extending direction. A pair of left and right erecting walls 53 is formed integrally with an upper portion of the mudguard 51. The left and right erecting walls 53 are erected to the rear from left and right edges, respectively, of the bending-plate portion 52. The left and right erecting walls 53 are progressively reduced in erecting height as they go toward the vertical intermediate position of the mudguard 51, and they disappear at the vertical intermediate position. The mudguard 51 has a lower end portion which is bent to be rearward convex as viewed from the side. In addition, the front surface of the lower end portion of the mudguard 51 is brought into contact with the rear surface of the cross member 16c of the swing arm 16.

A pair of left and right attachment portions 55 associated with the respective left and right fender side attachment portions 48 is located at both, left and right, sides of the upper end portion of the mudguard 51.

Figure 4:
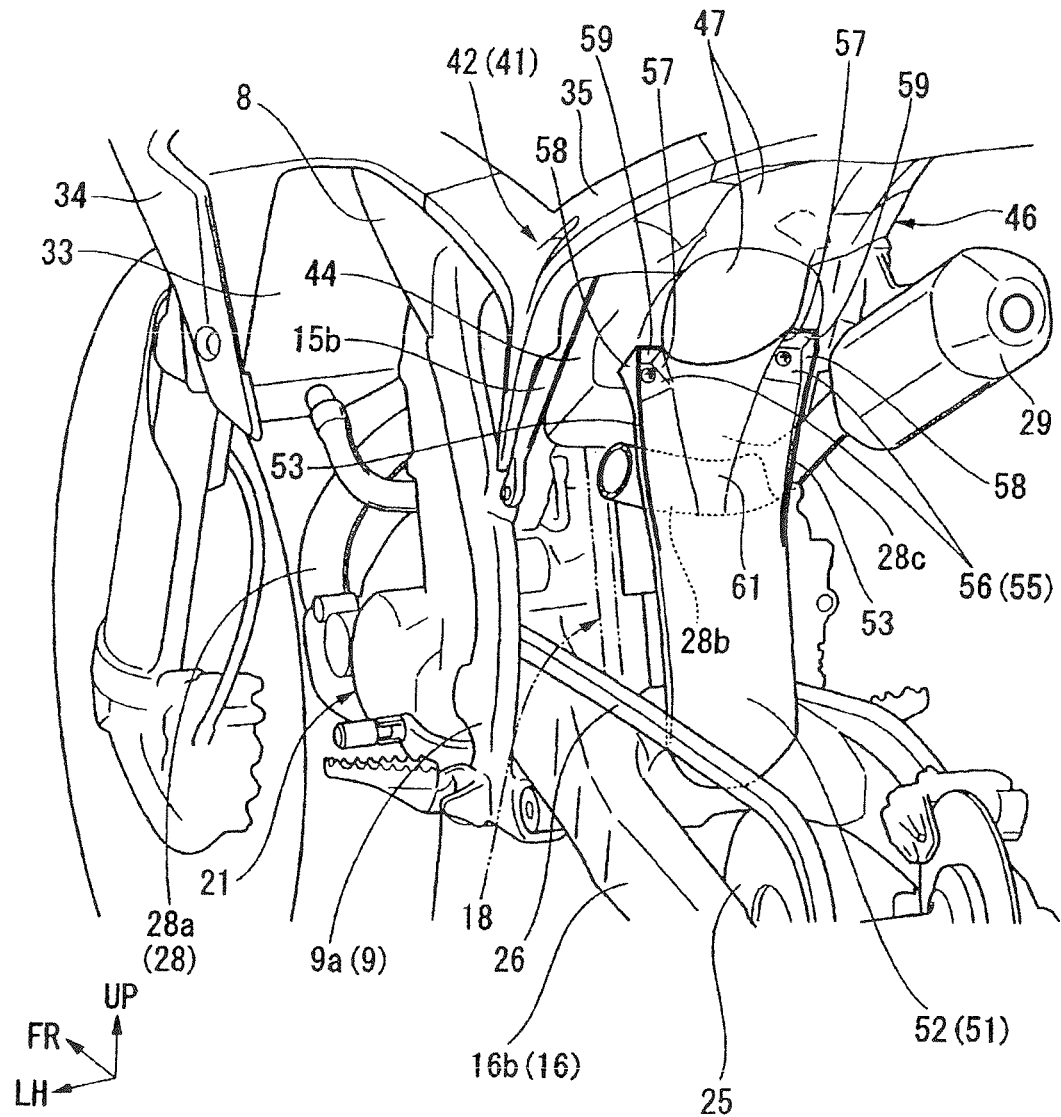
FIG. 4 is a perspective view of the vehicle-body rear portion of the motorcycle as viewed from the left and to the rear.
Figure 5:
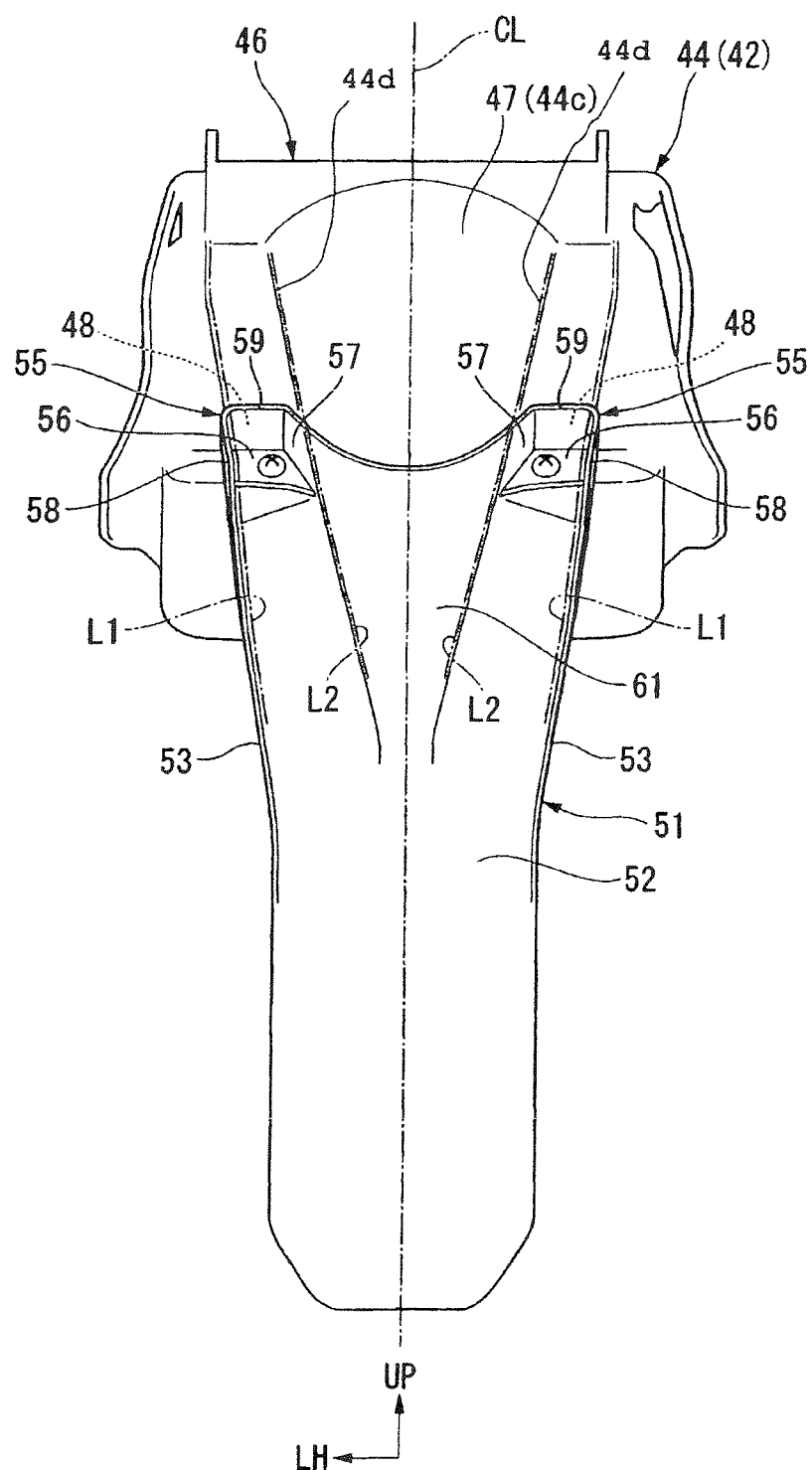
FIG. 5 is a rear view of a mudguard and a front lower case body of the motorcycle, the mudguard being attached to the front lower case body.
Figure 6:
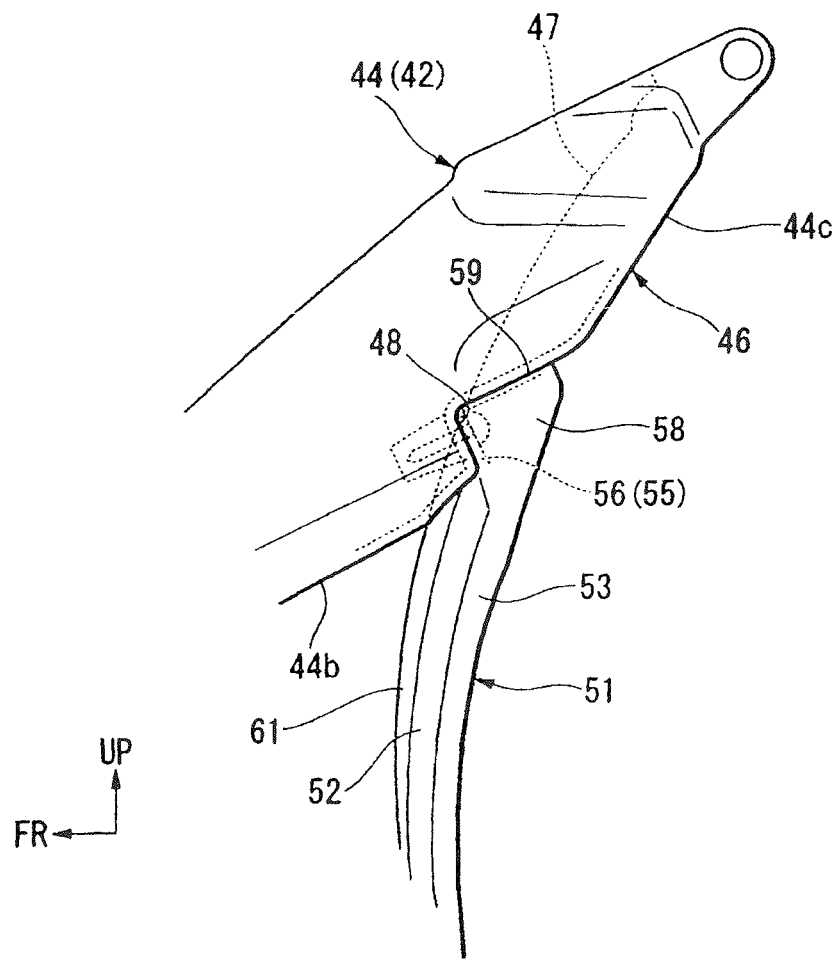
FIG. 6 is a left lateral view of the periphery of a joint portion between the mudguard and the front lower case body.

As illustrated in FIGS. 4, 5 and 6, each of the left and right attachment portions 55 has a fastening wall 56, an inside wall 57, an outside wall 58 and an upper wall 59. The fastening wall 56 is shaped as a rectangle as viewed from the back. In addition, the fastening wall 56 is brought into rearward contact with an upward inclined rear surface (a fastening surface) of the fender side attachment portion 48. The inside wall 57 erects to the rear from the left-right inside edge of the fastening wall 56. The outside wall 58 erects to the rear from the left-right outside edge of the fastening wall 56. The upper wall 59 erects to the rear from the upper edge of the fastening wall 56 and integrally continues into the inside and outside walls 57, 58. The fastening wall 56, the inside and outside walls 57, 58 and the upper wall 59 described above form a box-like shape opening to the rear and downward.

The left and right attachment portions 55 are fixedly fastened to the respective left and right fender side attachment portions 48. In this case, the fastening wall 56 is brought into contact with the rear surface of the fender side attachment portion 48. The upper wall 59 is brought into contact with the upper surface of the fender side attachment portion. The inside wall 57 is brought into contact with the inside surface of the fender side attachment portion 48. An upper edge, of the bending-plate portion 52, between the left and right attachment portions 55 is brought into contact with the lower surface of the case front-lower wall portion 44b. Thus, the attachment rigidity of the mudguard 51 to the rear fender 46 is increased.

In this way, even if the exhaust pipe 28 is arranged to shift the mudguard 51 to the rear to increases the vertical length of the mudguard 51, it is not necessary to enlarge an attachment surface on the rear fender 46 side (the air cleaner case 42 side) and to additionally install the attachment surface thereof. The mudguard 51 can be attached to the rear fender 46 with a high rigidity and an influence on the capacity of the air cleaner can be avoided. In addition, the left and right attachment portions 55 are fastened to the respective left and right fender side attachment portions 48 by inserting screws (or bolts) therethrough from the rear. The attachment portions 55 may be fastened by using stud bolts attached to the fender side attachment portions 48 so as to erect therefrom and nuts to be screwed to the corresponding stud bolts. The guard side attachment portions 55 may be joined to the respective fender side attachment portions 48 by using clips, rivets or the like.

The outside walls 58 of the left and right fastening walls 56 integrally and continuously continue into the corresponding upper portions of the left and right erecting walls 53. The rear edges of the left and right outer walls 58 and of the left and right erecting walls 53 continuously continue into the corresponding lower portions of ridges 44d, seen from the outside, on the leftward and rightward outsides of the front-lower case body 44. These ridge lines form integral character lines L1 (see FIG. 5). Thus, the outer appearance having a sense of unity between the rear fender 46 and the mudguard 51 can be created.

A front-lower concave portion 61 is formed on the left-right inside (between the left and right fastening walls 56) of the upper portion of the mudguard 51. The front-lower concave portion 61 integrally continues into the front-lower portion of the rear wheel runout concave portion 47 on the left-right inside of the rear wheel runout concave portion 47 of the rear fender 46. The front-lower concave portion 61 contributes to an improvement in the rigidity of the upper portion of the mudguard 51. The front-lower concave portion 61 is formed to be gradually reduced in depth as it goes toward the vertical intermediate position of the mudguard 51. Ridge lines of the left and right side ends of the front-lower concave portion 61 continuously continue into the corresponding lower portions of the ridge lines of the left and right edges included in the rear wheel runout concave portion 47 of the front lower case body 44. These form integral character lines L2 (see FIG. 5). Thus, similarly to the above, external appearance having a sense of unity between the rear fender 46 and the mudguard 51 can be created.

As described above, the upper portion of the mudguard 51, along with the air cleaner case 42 continuous with the upper side of the upper portion of the mudguard 51, continuously forms the character lines L1, L2 on the inside (the front-lower side) of the rear fender 46. The external appearance of the inside of the rear fender 46 can satisfactorily be maintained which is easily seen from the outside particularly in an off-road vehicle having a large wheel-stroke from the rear. In addition, the rear edges of the left and right side walls 58 and of the left and right erecting walls 53 and the ridge lines, of the rear fender 46, continuous with the ridge lines of the left and right side edges of the front-lower concave portion 61 include all lines forming the external appearance of the rear fender 46, such as edges of ribs.

As described above, the mudguard structure for a straddle-ride type vehicle according to the above embodiment is applied to the motorcycle 1 as below. The motorcycle 1 includes the rear swing arm 16 having the front end portion 16a vertically swingably supported by the body frame 5; the rear wheel 17 supported by the rear end portion of the rear swing arm 16; the rear fender 46 covering the rear wheel 17 from above; the rear shock absorber 18 disposed at the front end side of the rear swing arm 16 and interposed between the rear swing arm 16 and the body frame 5; and the mudguard 51 disposed between the rear shock absorber 18 and the rear wheel 17 in rear of the rear shock absorber 18 and attached to the rear fender 46 at the rear end portion. The mudguard 51 has the left and right erecting walls 53 erecting to the rear from the respective left and right outer edges of at least the upper portion thereof; and the front-lower concave portion 61 formed on the left-right inside of at least the upper portion and integrally continuing into the lower portion of the rear wheel runout concave portion 47 formed on the left-right inside of the rear fender 46. A pair of the left and right attachment portions 55 to the rear fender 46 is located on both, left and right, sides of the upper end portion of the mudguard 51. The left and right attachment portions 55 each include the fastening wall 56 brought into contact with the fender side attachment portion 48 of the rear fender 46 from the rear; the inside wall 57 erecting to the rear from the left-right inside edge of the fastening wall 56; the outside wall 58 erecting to the rear from the left-right outside edge of the fastening wall 56 and integrally continuing into the erecting wall 53; and the upper wall 59 erecting to the rear from the upper edge of the fastening wall 56 and integrally continuing into the inside and outside walls 57, 58.

With this configuration, the front-lower concave portion 61 and the erecting wall 53 are formed in the upper portion of the mudguard 51 which is the side supported by the rear fender 46. In addition, the box-like left and right attachment portions 55 having the inside and outside walls 57, 58 and the upper wall 59 and continuing into the erecting wall 53 are located in the upper portion of the mudguard 51. Therefore, while ensuring the rigidity of the upper portion of the mudguard 51 and of the left and right attachment portions 55, the enlargement of the attachment surface can be suppressed. Thus, the enlargement of the attachment surface on the rear fender 46 side can be suppressed and the degree of freedom for design can be increased. The front-lower concave portion 61 integrally continuing into the rear wheel runout concave portion 47 of the rear fender 46 is formed on the upper portion of the mudguard 51. Therefore, the integral external appearance of the mudguard 51 with the rear fender 46 can be formed to thereby improve visual quality.

The mudguard structure described above is such that the rear edges of the left and right erecting walls 53 and the left and right lateral edges of the front-lower concave portion 61 form the character lines L1, L2 integrally continuing into the ridge lines of the rear fender 46 seen from the outside. Therefore, the rear fender 46 and the mudguard 51 can be made to have external appearance with a sense of unity, leading to the further improved visual quality.

The mudguard structure described above is such that the rear fender 46 has the case-forming portion (the rear inclined portion 44c) forming at least a portion of the air cleaner case 42 mounted on the body frame 5. The mudguard 51 is mounted to the case-forming portion; therefore, although the mudguard 51 is configured to be mounted to the case-forming portion of the rear fender 46, an influence on the capacity of the air cleaner can be avoided.

The mudguard structure described above has the exhaust pipe 28 extending toward the rear of the vehicle body from the engine 21 mounted on the body frame 5, the exhaust pipe 28 passing through between the rear shock absorber 18 and the mudguard 51. Therefore, although the mudguard 51 is configured to be shifted to the rear in order to avoid the exhaust pipe 28, the upper end portion of the vertically elongated mudguard 51 can be attached to the rear fender 46 with high rigidity.

The mudguard structure described above is such that the exhaust pipe 28 has the single upstream side exhaust pipe 28a connected to the engine 21 and the pair of downstream side exhaust pipes 28b, 28c connected to the pair of respective left and right mufflers 29. The pair of downstream side exhaust pipes 28b, 28c bifurcates between the rear shock absorber 18 and the mudguard 51 as viewed from the side. One (the left downstream side exhaust pipe 28b) of the downstream side exhaust pipes 28b, 28c passes through between the rear shock absorber 18 and the mudguard 51. Thus, the exhaust pipe 28 having the single upstream side exhaust pipe 28a bifurcating into the downstream side exhaust pipes 28b, 28c can efficiently be arranged on the circumference of the mudguard 51.

In addition, the present invention is not limited to the embodiment described above. For example, the present invention may be applied to three-wheeled straddle-ride type vehicles having a swing arm type suspension on the rear wheel side (including vehicles having one front wheel and two rear wheels and vehicles having two front wheels and one rear wheel) and to four-wheeled straddle-ride type vehicles.

The configuration of the embodiment described above is just one example of the present invention and can be modified in various ways in a range not departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mudguard structure for a straddle-ride vehicle comprising:
   a rear swing arm having a front end portion vertically swingably supported by a body frame; a rear wheel supported by a rear end portion of the rear swing arm; a rear fender covering above the rear wheel; a rear shock absorber disposed at a front end side of the rear swing arm and interposed between the rear swing arm and the body frame; and a mud shield plate disposed between the rear shock absorber and the rear wheel to a rear of the rear shock absorber and attached to the rear fender,
   the mudguard structure for the straddle-ride type vehicle including:
   left and right erecting walls of the mud shield plate projecting to the rear from respective left and right outer edges of at least an upper portion thereof; and
   a plate side concave portion formed on a left-right inside of at least the upper portion of the mud shield and integrally connecting into a lower portion of a rear wheel runout concave portion formed on between left and right sides of the rear fender;
   left and right attachment portions for attaching the mud shield plate to the rear fender are located, respectively on left and right sides of an upper end portion of the mud shield plate; and
   each of the left and right attachment portions including a fastening wall that is brought into contact from a rearward direction with a fender side attachment portion of the rear fender;
   an inside wall erecting to the rear from an inside edge of the fastening wall;

an outside wall erecting to the rear from an outside edge of the fastening wall and integrally continuing into the erecting wall; and an upper wall erecting to the rear from an upper edge of the fastening wall and integrally continuing into the inside and outside walls.

2. The mudguard structure for a straddle-ride vehicle according to claim 1, wherein rear edges of the left and right erecting walls and left and right lateral edges of the plate side concave portion form character lines integrally continuing into ridge lines of the rear fender seen from outside of the vehicle.

3. The mudguard structure for a straddle ride vehicle according to claim 1, wherein the rear fender has a case-forming portion forming at least a portion of an air cleaner case mounted on the body frame, and the mud shield plate is attached to a lower side of the case-forming portion at a position above a muffler.

4. The mudguard structure for a straddle ride vehicle according to claim 2, wherein the rear fender has a case-forming portion forming at least a portion of an air cleaner case mounted on the body frame, and the mud shield plate is attached to a lower side of the case-forming portion at a position above a muffler cover arranged under the rear fender.

5. The mudguard structure for a straddle ride vehicle according to claim 1, wherein the vehicle includes an exhaust pipe extending toward the rear of the vehicle body from an engine mounted on the body frame, and the exhaust pipe passes through between the rear shock absorber and the mud shield plate.

6. The mudguard structure for a straddle ride vehicle according to claim 2, wherein the vehicle includes an exhaust pipe extending toward the rear of the vehicle body from an engine mounted on the body frame, and the exhaust pipe passes through between the rear shock absorber and the mud shield plate.

7. The mudguard structure for a straddle ride vehicle according to claim 3, wherein the vehicle includes an exhaust pipe extending toward the rear of the vehicle body from an engine mounted on the body frame, and the exhaust pipe passes through between the rear shock absorber and the mud shield plate.

8. The mudguard structure for a straddle ride type vehicle according to claim 5, wherein the exhaust pipe has a single upstream side exhaust pipe connected to the engine and a pair of downstream side exhaust pipes connected to a pair of respective left and right mufflers, the pair of downstream side exhaust pipes bifurcates between the rear shock absorber and the mudguard as viewed from the side, and one of the pair of downstream side exhaust pipes passes through between the rear shock absorber and the mud shield plate.

9. The mudguard structure for a straddle ride type vehicle according to claim 6, wherein the exhaust pipe has a single upstream side exhaust pipe connected to the engine and a pair of downstream side exhaust pipes connected to a pair of respective left and right mufflers, the pair of downstream side exhaust pipes bifurcates between the rear shock absorber and the mudguard as viewed from the side, and one of the pair of downstream side exhaust pipes passes through between the rear shock absorber and the mud shield plate.

10. The mudguard structure for a straddle ride type vehicle according to claim 7, wherein the exhaust pipe has a single upstream side exhaust pipe connected to the engine and a pair of downstream side exhaust pipes connected to a pair of respective left and right mufflers, the pair of downstream side exhaust pipes bifurcates between the rear shock absorber and the mudguard as viewed from the side, and one of the pair of downstream side exhaust pipes passes through between the rear shock absorber and the mud shield plate.

11. A mudguard structure adapted to be used with a straddle-ride vehicle comprising:

left and right erecting walls of the mud shield plate projecting to a rear from respective left and right outer edges of at least an upper portion thereof;

a plate side concave portion formed on a left-right inside of at least an upper portion and integrally connecting into a lower portion of a rear wheel runout concave portion formed on between left and right sides of a rear fender, a pair of left and right attachment portions for attaching the mud shield plate to the rear fender are located, respectively on left and right sides of an upper end portion of the mud shield plate, and a fastening wall provided on each of the attachment portions, the fastening portion being adapted to be brought into contact from a rearward with a fender side attachment portion of the rear fender;

an inside wall erecting to the rear from an inside edge of the fastening wall;

an outside wall erecting to the rear from an outside edge of the fastening wall and integrally continuing into the erecting wall; and an upper wall erecting to the rear from an upper edge of the fastening wall and integrally continuing into the inside and outside walls.

12. The mudguard structure adapted to be used with a straddle-ride vehicle according to claim 11, wherein rear edges of the left and right erecting walls and left and right lateral edges of the plate side concave portion form character lines integrally continuing into ridge lines of the rear fender seen from outside of the vehicle.

13. The mudguard structure adapted to be used with a straddle ride vehicle according to claim 11, wherein the rear fender has a case-forming portion forming at least a portion of an air cleaner case mounted on a body frame, and the mud shield plate is attached to a lower side of the case-forming portion.

14. The mudguard structure adapted to be used with a straddle ride vehicle according to claim 12, wherein the rear fender has a case-forming portion forming at least a portion of an air cleaner case mounted on a body frame, and the mud shield plate is attached to a lower side of the case-forming portion at a position above a muffler cover arranged under the rear fender.

15. The mudguard structure adapted to be used with a straddle ride vehicle according to claim 11, wherein the vehicle includes an exhaust pipe extending toward the rear of the vehicle body from an engine mounted on a body frame, and the exhaust pipe passes through between a rear shock absorber and the mud shield plate.

16. The mudguard structure adapted to be used with a straddle ride vehicle according to claim 12, wherein the vehicle includes an exhaust pipe extending toward the rear of the vehicle body from an engine mounted on a body frame, and the exhaust pipe passes through between a rear shock absorber and the mud shield plate.

17. The mudguard structure adapted to be used with a straddle ride vehicle according to claim 13, wherein the vehicle includes an exhaust pipe extending toward the rear of the vehicle body from an engine mounted on a body frame, and the exhaust pipe passes through between a rear shock absorber and the mud shield plate.

18. The mudguard structure adapted to be used with a straddle ride type vehicle according to claim 15, wherein the exhaust pipe has a single upstream side exhaust pipe connected to the engine and a pair of downstream side exhaust pipes connected to a pair of respective left and right mufflers, the pair of downstream side exhaust pipes bifurcates between the rear shock absorber and the mudguard as viewed from the side, and one of the pair of downstream side exhaust pipes passes through between the rear shock absorber and the mud shield plate.

19. The mudguard structure adapted to be used with a straddle ride type vehicle according to claim 16, wherein the exhaust pipe has a single upstream side exhaust pipe connected to the engine and a pair of downstream side exhaust pipes connected to a pair of respective left and right mufflers, the pair of downstream side exhaust pipes bifurcates between the rear shock absorber and the mudguard as viewed from the side, and one of the pair of downstream side exhaust pipes passes through between the rear shock absorber and the mud shield plate.

20. The mudguard structure adapted to be used with a straddle ride type vehicle according to claim 17, wherein the exhaust pipe has a single upstream side exhaust pipe connected to the engine and a pair of downstream side exhaust pipes connected to a pair of respective left and right mufflers, the pair of downstream side exhaust pipes bifurcates between the rear shock absorber and the mudguard as viewed from the side, and one of the pair of downstream side exhaust pipes passes through between the rear shock absorber and the mud shield plate.

* * * * *